United States Patent
Areskogh

(10) Patent No.: US 12,162,900 B2
(45) Date of Patent: Dec. 10, 2024

(54) PROCESS FOR PRODUCING AGGLOMERATED LIGNIN AND USE THEREOF

(71) Applicant: Stora Enso OYJ, Helsinki (FI)

(72) Inventor: Dimitri Areskogh, Bromma (SE)

(73) Assignee: Stora Enso OYJ, Helsinki (FI)

( * ) Notice: Subject to any disclaimer, the term of this patent is extended or adjusted under 35 U.S.C. 154(b) by 616 days.

(21) Appl. No.: 17/438,570

(22) PCT Filed: Mar. 11, 2020

(86) PCT No.: PCT/IB2020/052132
§ 371 (c)(1),
(2) Date: Sep. 13, 2021

(87) PCT Pub. No.: WO2020/183383
PCT Pub. Date: Sep. 17, 2020

(65) Prior Publication Data
US 2022/0127296 A1    Apr. 28, 2022

(30) Foreign Application Priority Data
Mar. 14, 2019 (SE) .................................. 1950320-0

(51) Int. Cl.
| C07G 1/00 | (2011.01) |
| B02C 23/00 | (2006.01) |
| B29B 9/08 | (2006.01) |
| B30B 11/16 | (2006.01) |

(52) U.S. Cl.
CPC .................. *C07G 1/00* (2013.01); *B29B 9/08* (2013.01); *B02C 23/00* (2013.01); *B30B 11/16* (2013.01)

(58) Field of Classification Search
CPC .. C07G 1/00; B29B 9/08; B02C 23/00; B30B 11/16
USPC ....................................................... 530/500
See application file for complete search history.

(56) References Cited

U.S. PATENT DOCUMENTS

| 8,852,301 B1 | 10/2014 | Bootsma |
| 2004/0012114 A1* | 1/2004 | Eyerer ..................... B29B 9/08 |
| | | 264/117 |
| 2010/0154296 A1 | 6/2010 | Malhotra |
| 2010/0218420 A1 | 9/2010 | Harada et al. |
| 2010/0263268 A1 | 10/2010 | Haas |
| 2011/0302832 A1 | 12/2011 | Grønn |
| 2015/0068112 A1 | 3/2015 | Varvemaa et al. |

FOREIGN PATENT DOCUMENTS

| CN | 106426444 A * | 2/2017 | ................ B27J 1/00 |
| RU | 2031836 C1 | 3/1995 | |
| RU | 2153524 C2 | 7/2000 | |
| RU | 2197389 C1 | 1/2003 | |
| RU | 2307033 C2 | 2/2007 | |
| RU | 2326900 C1 | 6/2008 | |
| RU | 2671824 C1 | 11/2018 | |
| WO | 2006031175 A1 | 3/2006 | |
| WO | 2017108055 A1 | 6/2017 | |
| WO | 2018035598 A1 | 3/2018 | |
| WO | 2018035598 A8 | 3/2018 | |

OTHER PUBLICATIONS

Jiang, CN 106426444 A machine translation in English, Feb. 22, 2017. (Year: 2017).*
Extended European search report for corresponding European application No. 20770038.6, dated Nov. 2, 2022.
Beck, H. et al., BIA-Report 13/97, Combustion and explosion characteristics of dusts, ISBN: 3-88383-469-6, Nov. 1997.
Health and Safey Executive, Safe collection of wood waste: Prevention of fire and explosion, www.hse.gov/uk/pubns/wis32.pdf, Jun. 2011.
International Search report from corresponding PCT application No. PCT/IB2020/052132 mailed May 5, 2020.

\* cited by examiner

*Primary Examiner* — David T Karst
(74) *Attorney, Agent, or Firm* — Greer, Burns & Crain, Ltd.

(57) ABSTRACT

The present invention is directed to a process to produce agglomerated lignin with a controlled particle size distribution. The agglomerated lignin is essentially free of dust so that the risk of dust explosion is greatly reduced.

6 Claims, No Drawings

PROCESS FOR PRODUCING AGGLOMERATED LIGNIN AND USE THEREOF

This application is a U.S. National Phase under 35 U.S.C. § 371 of International Application No. PCT/IB2020/052132, filed Mar. 11, 2020, which claims priority under 35 U.S.C. §§ 119 and 365 to Swedish Application No. 1950320-0, filed Mar. 14, 2019.

FIELD OF THE INVENTION

The present invention is directed to a process to produce agglomerated lignin with a controlled particle size distribution. The agglomerated lignin is essentially free of dust so that the risk of dust explosion is greatly reduced.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin has been extensively investigated as suitable substitute for phenol during production of phenol-formaldehyde binders for production of panel boards such as plywood, hard board, medium density fiberboard or particle boards.

It is preferable to utilize a lignin product with minimal amount of moisture to avoid bringing unnecessary additional water to the process. However, handling of lignin with a minimal moisture content of 0-5% (on weight basis) presents several serious issues. Among those is that the lignin during any kind of handling forms dust clouds. These dust clouds can further lead to dust explosions when sufficiently high concentration of combustible material is suspended in air.

Therefore, there exists a need for a method to process lignin in such a way that the risk of dust explosion can be greatly reduced.

Several attempts to apply roller compactor processing of lignin are known. RU2197389, RU2307033, US20100218420, and US2010154296 disclose processes to produce briquettes where lignin is a component in the final briquette composition. In the processes described therein lignin is used as a liquid or solid binder to bind the various components together in order to generate briquettes. The end usage of these briquettes is in the field of energy generation.

SUMMARY OF THE INVENTION

The present invention provides a solution to one more of the problems of the prior art. A particular advantage of the process according to the present invention is that the dust forming fines are reduced to such extent that no risk of dust explosion exists.

The present invention is directed to a process to produce agglomerated lignin with a controlled particle size distribution, comprising the steps of
a) compaction of lignin, wherein lignin having a moisture content of from 1 wt-% to 45 wt-% is agglomerated by means of roll compaction, wherein the rolls have cavities and wherein the depth of each cavity used in the roll compaction is from 0.1 mm to 10 mm;
b) subjecting the compacted lignin from step a) to a milling step; followed by
c) a sieving step, wherein the product of step b) is subjected to sieving to remove particles having a particle diameter below 100 µm, to produce a final agglomerated lignin with a controlled particle size distribution in which the particle size distribution is governed by the porosity of the sieving screens used in the sieving step; and wherein less than 10 wt-% of the particles retained after step c) have a particle diameter below 100 µm.

The compaction according to the present invention is preferably carried out without addition of any additives to the material to be compacted. In the context of the present invention, an additive is a substance that is added to the process to improve adhesion between the lignin particles. Thus, additives are substances that are added, but that are not present in the lignin that is the starting material in step a). Thus, neither moisture, such as water, nor other components already present in the lignin that is the starting material in step a), are considered additives in the context of the present invention.

The present invention is also directed to the use of the agglomerated lignin having a controlled particle size distribution obtained as the product of step c). For example, the lignin can be utilized as an intermediate in chemical synthesis processes, such as in the production of binders.

DETAILED DESCRIPTION

It is intended throughout the present description that the expression "lignin" embraces any kind of lignin, e.g. lignin originated from hardwood, softwood or annual plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%. Thus, the lignin used according to the process of the present invention preferably contains less than 10%, preferably less than 5% impurities. The lignin may then be separated from the black liquor by using the process disclosed in WO2006031175.

Preferably, the lignin is dried before compaction, i.e. before step a) of the process according to the present invention. The drying of the lignin is carried out by methods and equipment known in the art. The lignin used in step a) has a moisture content of from 1 wt-% to 45 wt-%. Preferably, the moisture content of the lignin before compaction according to the present invention is less than 25 wt-%, preferably less than 10 wt-%, more preferably less than 8 wt-%. The temperature during the drying is preferably in the range of from 80° C. to 160° C., more preferably in the range of from 100° C. to 120° C.

The lignin powder obtained after drying has a wide particle size distribution ranging from 1 µm to 2 mm which is significantly skewed towards the micrometer range, meaning that a significant proportion of the particles has a diameter in the range of 1 to 200 micrometers. It is known in the art that there is a strong correlation between explosivity characteristics and particle size distribution exists (BIA-Report 13/97 Combustion and explosion characteristics of dusts), that is, the smaller the particles, the more severe is the risk of explosion. The particles below a diameter of 100 micrometers are here considered as fines.

The roll compaction of lignin can be achieved by a roller compactor to agglomerate the lignin particles. The present invention is a process comprising three steps: compaction, milling and sieving.

In the compaction step a), a first intermediate product is generated. Here, the fine lignin powder is usually fed through a hopper and conveyed by means of a horizontal or vertical feeding screw into the compaction zone where the material is compacted into flakes by compaction rollers with a defined gap. By controlling the feeding screw speed, the pressure development in the compaction zone, flakes with uniform density can be obtained. The pressure development in the compaction zone can preferably be monitored and controlled by the rotational speed of the compaction rolls. As the powder is dragged between the rollers, it enters what is termed as the nip area where the density of the material is increased and the powder is converted into a flake or ribbon. The rolls used have cavities. The depth of each cavity used in the roll compaction is from 0.1 mm to 10 mm, preferably from 1 mm to 8 mm, more preferably from 1 mm to 5 mm or from 1 mm to 3 mm. The specific press force exerted during the compaction may vary depending on the equipment used for compaction, but may be in the range of from 1 kN/cm to 100 kN/cm. Equipment suitable for carrying out the compaction are known in the art.

Preferably, the lignin used in step a) is provided in the form of a powder having a particle size distribution such that at least 25 wt-% of the lignin has a particle diameter of from 1 μm to 100 μm.

In the milling step b) of the process, the first intermediate product from the compaction step is subjecting to milling or grinding, such as by means of rotary granulator, cage mill, beater mill, hammer mill or crusher mill and or combinations thereof. During this step, a secondary intermediate product is generated.

In the sieving step c) of the process, the secondary intermediate product from the milling step b) is screened by means of physical fractionation such as sieving, also referred to as screening, to obtain a final product which is agglomerated lignin with a defined particle size distribution set by the porosity of the sieves or screens in this step. The sieve or screen is selected such that most particles having a diameter below 100 μm pass through the screen and are rejected and preferably returned to the compaction step, whereas most particles having a diameter above 100 μm are retained and are the product of the sieving step and of the process according to the present invention. The sieving may be carried out in more than one step, i.e. the sieving can be carried out such that the crushed material from step b) passes sequentially through more than one screen or sieve. By using a screening stage with two or more different screen porosities, several fractions with more defined particle size distribution are obtained.

In one embodiment, the rolls configuration is such that the first roll has an annual rim in such configuration so that the powder in the nip region is sealed in the axial direction along the roller surface.

In one embodiment, the roll configuration is such that the nip region is sealed in the axial direction along the roller surface with a static plate.

By ensuring that the nip region is sealed, loss of powder at the axial ends of the rollers is minimized as compared to entirely cylindrical nip rollers.

It is particularly beneficial to carry out the compaction according to the present invention on a material that is essentially only lignin, i.e. in the absence of additives, since that makes the use of the compacted product easier, due to the absence of binders or other components that could otherwise negatively influence the application in which the compacted, milled and sieved lignin is supposed to be used.

A particular advantage of the process according to the present invention is that the dust forming fines are reduced to such extent that no risk of dust explosion exists.

A further advantage of the process according to the present invention is that the final agglomerated lignin can be easily handled, transported and stored. A further advantage of the process according to the present invention is that it can be automated to high degree in a closed loop configuration, wherein the rejects from the compaction step, the subsequent grinding step and the final screening step are returned to the roller compaction phase to maintain a stable process flow and a uniform particle size distribution of the final product.

EXAMPLES

Example 1—Production and Characterization of the Lignin Raw Material

Lignin Powder Dried with a Ring Dryer to a Final Dry Content of 96%.

Wet lignin from the final filter in a production plant operating according to the LignoBoost process was processed in a VetterTec ring dryer to a final dry content of 96%. Dry content of the final material was obtained as described in ISO-638. Particle size distribution (PSD) was analyzed by sieving as described in ASTM D1921-06 standard method. Bulk density of the product was obtained as described in ISO 697. The explosivity characteristics of the final material were obtained by determination of Minimum Ignition Energy (MIE) according to EN 13821.

The obtained dry content, and explosivity characteristics of the product as described are listed in Table 1.

Example 2 (Comparative) Agglomeration of Dry Lignin by Means of Briquetting

Lignin from Example 1 was subjected to briquetting to generate briquettes. This was performed on a roller press type 52/6.5 (Maschinenfabrik Köppern GmbH) equipped with compaction rolls with a working width of 130 mm. The compaction rolls were furnished with briquetting moulds with a dimension of approximately 30×20×20 mm (length× width×depth) uniformly distributed on the circumference of the compaction rolls. No sealing of the nip region between compactor rolls was used.

It was found that the fine powder would simply flow through the static gap between the two rollers and as such no agglomeration of the lignin material could be achieved.

Example 3 (Comparative)—Agglomeration of Wet Lignin by Means of Briquetting

Lignin from Example 1 was pre-mixed with water prior to agglomeration. The water content was 11% on dry weight basis. The pre-mixing was performed prior to agglomeration by means of a Eirich R08 batch mixer. The produced intermediate was used to generate briquettes as described in Example 2. It was observed that excessive clogging of the moulds on the compaction roll surfaces was occurring to such extent that no briquettes could be produced.

Example 4 (Comparative)—Agglomeration of Wet Lignin by Means of Briquetting

Lignin from Example 1 was pre-mixed with water prior to agglomeration. The water content was 30% on dry weight basis. The pre-mixing was performed prior to agglomeration by means of a Eirich R08 batch mixer. The produced intermediate was used to generate briquettes as described in Example 2. It was observed that excessive clogging of the moulds on the compaction roll surfaces was occurring to such extent that no briquettes could be produced.

Example 5 (Comparative)—Agglomeration of Lignin by Means of Briquetting with Additive 1

Lignin from Example 1 was used in conjunction with recycled fluff pulp to generate briquettes as described in Example 2. The fluff pulp was used to retard the rapid material flow and ensure a homogeneous material feed. It was observed that excessive clogging of the moulds on the compaction roll surfaces was occurring to such extent that no briquettes could be produced.

Example 6 (Comparative)—Agglomeration of Lignin with Additive 2

Lignin from Example 1 was used in conjunction with recycled fluff pulp to generate flakes on a roller press type 52/10 (Maschinenfabrik Köppern GmbH) where the compaction rolls were furnished with flaking moulds with elliptical shaped cavities with dimension of 30×20×5 mm uniformly distributed on the circumference of the compaction rolls. The fluff pulp was used to retard the rapid material flow and ensure a homogeneous material feed. It was observed that excessive clogging of the moulds on the compaction roll surfaces was occurring to such extent that no flakes could be produced.

Example 7—Agglomeration of Wet Lignin with

Lignin from Example 1 was pre-mixed with water prior to agglomeration. The water content was 13% on dry weight basis. The pre-mixing was performed prior to agglomeration by means of a Eirich R08 batch mixer. The produced intermediate was used to generate flakes on a roller press type 52/10 (Maschinenfabrik Köppern GmbH) where the compaction rolls were furnished with flaking moulds with elliptical shaped cavities with dimension of 30×20×5 mm uniformly distributed on the circumference of the compaction rolls. It was observed that flakes could be produced.

Subsequent milling by means of a beater mill (Gebr. Jehmlich GmbH) and manual sieving, generated agglomerated lignin with a target particle size distribution of 0.25-1.0 mm. Results are listed in Table 2.

Example 8 Agglomeration of Wet Lignin

Lignin from Example 1 was pre-mixed with water prior to agglomeration. The water content was 30% on dry weight basis. The pre-mixing was performed prior to agglomeration by means of a Eirich R08 batch mixer. The produced intermediate was used to generate flakes on a roller press type 52/10 (Maschinenfabrik Köppern GmbH) where the compaction rolls were furnished with flaking moulds with elliptical shaped cavities with dimension of 30×20×5 mm uniformly distributed on the circumference of the compaction rolls. It was observed that flakes could be produced.

Subsequent milling by means of a cage mill (Stedman Machine Company) and manual sieving, generated agglomerated lignin with a target particle size distribution of 1-2.0 mm. Results are listed in Table 2.

Example 9—Agglomeration of Dry Lignin

Lignin from Example 1 was subjected to agglomeration on a Hosokawa Pharmapaktor L 200/50P equipped with compaction rolls with a working diameter of 50 mm. The compaction rolls were furnished with grooves with dimensions of 50×1×1 mm spatially arranged in the axial direction of the compaction roll. A static plate was mounted on the radial sides of the two compaction rolls to seal the nip region.

It was observed that flakes with a dimension of approximately 80×50×2 mm (length×width×depth) could be generated as a first intermediate product. An approximate yield on weight basis of this first intermediate product could be obtained to at least 80%.

The flakes were subsequently milled in a FC200 flake crusher (Hosokawa Bepex) equipped with 2 mm screen to generate a secondary intermediate product. This secondary intermediate product was subjected to screening using a vibratory screener equipped with a screen with a defined mesh size to match the target fraction of the agglomerated lignin. In this example, a screen with a mesh size of 200 micrometers was used.

Example 10—Agglomeration of Dry Lignin

Lignin from Example 1 was subjected to agglomeration on a Hosokawa Pharmapaktor L 200/50P equipped with compaction rolls with a working diameter of 50 mm. The compaction rolls were furnished such that the first roll was equipped with an annual rim with a height of 10 mm. The second roll had an annual recess complimentary to the rim of the first roll. The rolls were further furnished with grooves with dimensions of 50×1×1 mm (length×width×depth) spatially arranged in the axial direction of the compaction roll. It was observed that flakes with a dimension of approximately 80×50×2 mm (length×width×depth) could be generated as a first intermediate product. An approximate yield on weight basis of this first intermediate product could be obtained to at least 85%.

The first intermediate product was processed in a FC 200 flake crusher equipped with a 5 mm screen and the secondary intermediate was subjected to screening using a vibratory screener equipped with a screen was a screen with a mesh size of 500 micrometer. Product yields are tabulated in Table 2.

Example 11—Agglomeration of Dry Lignin

Lignin from Example 1 was subjected to agglomeration on an Alexanderwerk WP200 Pharma (Alexanderwerk Aktiengesellschaft). The unit was equipped with knurled and grooved rollers with a working width of 75 mm. Static side plates were used. The unit was further equipped with a two-stage granulator where the first stage was equipped with a 2.5 mm screen and the second was equipped with a 1.25 mm screen. Mounted directly after the two-stage granulator was a screening deck equipped with one single screen with a defined mesh size to match the target fraction of the final agglomerated lignin. In this example, a mesh size of 600 micrometer was used.

Two fractions of agglomerated lignin were collected. Fraction 1 was collected before the screen deck and Fraction 2 was collected after the screening deck. Particle size distribution of Fraction 1 and Fraction 2 was measured by means of sieve analysis (Table 3).

Example 12—Agglomeration of Dry Lignin

Lignin from Example 1 was subjected to agglomeration as described in Example 11 with a 5.0 mm screen in the first stage of the two-stage granulator and a 2.0 mm screen in the second stage of the two-stage granulator. A screen desk with 4 screens with mesh size of 1.6 mm, 1.25 mm, 1.00 mm and 0.80 mm was used. Two fractions of agglomerated lignin were collected. Fraction 1 was collected before the screen deck and Fraction 2 was collected after the screening deck. Particle size distribution of Fraction 1 and Fraction 2 was measured by means of sieve analysis (Table 3).

TABLE 1

Physical Characteristics

| Sample | Dry Content (%-wt) | Bulk density (kg/dm³) | MIE (mJ) |
|---|---|---|---|
| Lignin, Example 1 | 96 | 0.436 | <10 |
| Lignin, Example 9 | 96 | 0.506 | >1000 |

TABLE 2

Agglomeration Results

| Sample | Shape | Density (g/cm³) | Target fraction (%) | Undersize fraction (%) | Oversize fraction (%) |
|---|---|---|---|---|---|
| | | | Yield of Granulation | | |
| Example 7 | Flakes | n.d. | 63.0 | 28.6 | 8.4 |
| Example 8 | Flakes | 0.99 | 23.4 | 50.50 | 26.1 |
| Example 9 | Agglomerates | n.d. | 80 | 20 | 0.0 |
| Example 10 | Agglomerates | n.d. | 57.0 | 43.0 | 0.0 |
| Example 11 | Agglomerates | 0.51 | N.D. | N.D. | N.D. |
| Example 12 | Agglomerates | 0.46 | N.D | N.D. | N.D. |

TABLE 3

Particle Size Distribution of Agglomerated Lignin

| Sample Description | 2000-1600 µm (%) | 1600-1000 µm (%) | 1000-500 µm (%) | 500-0 µm (%) |
|---|---|---|---|---|
| Example 11 Fraction 1 | 0.12 | 15.96 | 51.24 | 32.67 |
| Example 11 Fraction 2 | 0.17 | 30.37 | 69.28 | 0.17 |
| Example 12 Fraction 1 | 1.45 | 28.04 | 51.09 | 19.42 |
| Example 12 Fraction 2 | 0.0 | 1.9 | 92.74 | 5.35 |

Thus, the particle size distribution of the final agglomerated and granulated lignin can be controlled by the configuration of the sieving stage. For example, by employing a sieving stage with one specific screen porosity, two fractions will be generated, one target fraction and one reject fraction. While the target fraction can be used further, the reject fraction can be returned to the compaction stage thus minimizing the losses during the process.

The target fraction can, depending on the end use, be sieved further or used as a final product. By employing a sieving stage with two or more screen porosities, several fractions with more defined particle size distribution are obtained.

In view of the above detailed description of the present invention, other modifications and variations will become apparent to those skilled in the art. However, it should be apparent that such other modifications and variations may be effected without departing from the spirit and scope of the invention.

The invention claimed is:

1. A process to produce agglomerated lignin with a controlled particle size distribution, the process comprising the steps of
   a) compacting lignin, wherein the lignin comprises a moisture content of from 1 wt-% to 45 wt-%, and wherein the lignin is agglomerated by roll compaction with two or more rolls, wherein the two or more rolls have cavities and wherein a depth of each cavity used in the roll compaction is from 0.1 mm to 10 mm;
   b) subjecting the compacted lignin from step a) to a milling step; followed by
   c) a sieving step, wherein the milled lignin of step b) is subjected to sieving to remove particles having a particle diameter below 100 µm and to produce a final agglomerated lignin with a controlled particle size distribution in which a particle size distribution is governed by a porosity of sieving screens used in the sieving step;
   and wherein less than 10 wt-% of the particles retained after step c) have a particle diameter below 100 µm.

2. The process according to claim 1, wherein the lignin is agglomerated without addition of any additives.

3. The process according to claim 1, wherein the lignin used in step a) comprises a moisture content of from 5 wt-% to 25 wt-%.

4. The process according to claim 3, wherein the lignin used in step a) comprises a moisture content of from 5 wt-% to 10 wt-%.

5. The process according to claim 1, wherein the depth of each cavity used in the roll compaction in step a) is from 1 mm to 5 mm.

6. The process according to claim 1, wherein the sieving is carried out in more than one step, using at least two sieving screens with different porosities.

* * * * *